United States Patent [19]

Erland et al.

[11] 4,417,791
[45] Nov. 29, 1983

[54] PROCESS FOR COMPOSITE PHOTOGRAPHY

[76] Inventors: Jonathan Erland, 6026 Hayes Ave., Los Angeles, Calif. 90042; Roger Dorney, 7057 Sunny Slope, Van Nuys, Calif. 91405

[21] Appl. No.: 409,749

[22] Filed: Aug. 19, 1982

[51] Int. Cl.³ ............................................ G03B 19/18
[52] U.S. Cl. ...................................... 352/45; 352/46; 352/48; 352/89; 352/49
[58] Field of Search ....................... 352/45, 46, 47, 48, 352/85, 87, 89, 49, 44

[56] References Cited

U.S. PATENT DOCUMENTS

| | | | |
|---|---|---|---|
| 1,697,315 | 1/1929 | Handschiegl | 352/46 |
| 1,840,669 | 1/1932 | Handschiegl | 352/46 |
| 1,840,670 | 1/1932 | Handschiegl | 352/46 |
| 1,860,737 | 5/1932 | Handschiegl | 352/45 |
| 3,085,877 | 4/1963 | Reid | 352/49 |
| 3,149,969 | 9/1964 | Vlahos | 352/45 |
| 3,158,477 | 11/1964 | Vlahos | 352/45 |

FOREIGN PATENT DOCUMENTS 693823  7/1953  United Kingdom .................. 352/45

OTHER PUBLICATIONS

*American Cinematographer*, Sep. 1982, pp. 912–932.
*Cinefex*, Oct. 1982, No. 10, pp. 40–72.

*Primary Examiner*—Monroe H. Hayes
*Attorney, Agent, or Firm*—Hubbell, Cohen, Stiefel & Gross

[57] ABSTRACT

A reverse blue screen process for travelling matte cinematography, which comprises the formation of travelling mattes by pre-coating models or other foreground subjects utilized in composite cinematography with one or more phosphor materials which are invisible upon exposure to visible light, but which emit light of predetermined wavelengths upon excitation by ultraviolet light, and exposing the models through appropriate filters to produce mattes of the predetermined portions of the models coated with the phosphorescing materials, by thus reversing the conventional blue screen process for travelling matte cinematography and exposing an illuminating foreground subject against an opaque background rather than an opaque foreground subject against an illuminated background, it is possible for the first time to successfully matte finely detailed models or other foreground subjects displaying specular reflectance in a single film process.

9 Claims, 4 Drawing Figures

FIG. 4
HOLD-OUT MATTE
(FOR REVERSE BLUE ONLY)
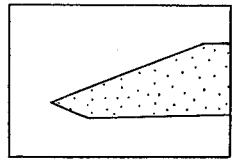
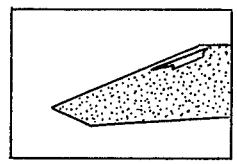
HOLD-OUT MATTE
(FOR RED SCREEN)
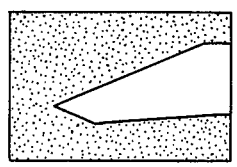
BURN-IN
MATTE
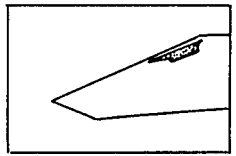
MATTE DIFFERENCE
MATTE

PROCESS FOR COMPOSITE PHOTOGRAPHY

BACKGROUND ART

This invention relates to composite photography, and more particularly to an improved process for use in motion picture travelling matte photography. It is particularly suitable for the compositing of images incorporating as foreground subjects finely detailed models of aircraft, space ships or the like which have metallic or glossy paint surfaces exhibiting specular optical reflectance and/or which include minute elements such as thin wires, struts, wings or antennae.

In motion picture production, it is sometimes impractical or impossible to place actors in specific environments to be depicted. To resolve this problem, various techniques have been evolved over the years to composite such scenes from separately filmed "elements." Initially, in early films such as Georges Melies' "Trip to the Moon" (1902) animation was resorted to. Thereafter, techniques were utilized such as the "held/take" process, in which a scene was shot with predetermined areas of the successive frames blocked out in order to preclude exposure thereof. The unexposed portions of the successive frames were thereafter exposed to the desired foreground subjects with the background areas blocked off with an opaque matte to protect the previously recorded latent images thereon. Essentially the same process is used to incorporate a painting which depicts the distant, dangerous, or totally imaginary scene against which the actors are to appear; this is known as matte painting.

In order to depict actors or other foreground subjects moving in front of the desired background scenes, various techniques were developed. One early approach involved the so-called "carousel" in which motion effects were simulated, for example, by photographing actors on dummy horses or in automobiles in front of a cylindrical, painted backdrop revolving through the frame behind the actors. This technique evolved into rear projection/front projection filming operations in which a separately filmed background scene was projected onto a screen behind the foreground subject and re-photographed simultaneously therewith to produce a composite image.

The use of such operations, however, necessitates synchronizing the rear projection system and the front projection camera, as well as accurate balancing of both the illumination across the projected image of the background scene and the illumination and color balance of the foreground subject, relative to the background scene. Moreover, such techniques are inherently expensive, requiring the prior filming and independent processing of the background scene and the additional expensive studio time for filming the foreground subject in conjunction with the background plate. There is usually a discernable loss of image quality in the rephotographed projected image when compared to the original photography of the foreground action.

To retain both image quality and the flexibility inherent in optical compositing, while insuring the freedom of movement basic to the front projection technique, it became necessary to create mattes which would change from frame to frame, or "travel." Such "travelling mattes" were initially produced manually or mechanically; in order, however, to meet the ever-increasing demand for fidelity, a wide variety of photographic techniques for producing travelling mattes have subsequently been developed. Such generally utilize either the so-called "single-film" or "multi-film" approaches.

Several single-film and multi-film systems of travelling matte cinematography have been described in the patent literature. See, for example, U.S. Pat. Nos. 1,673,019; 1,863,827; 1,955,993; 2,013,886; 2,028,863; 2,232,144; 2,277,141; 2,297,598; 2,461,127; 2,609,294; 2,651,233; 2,693,126; 2,740,712; 3,037,422; 3,095,304; 3,149,969; 3,158,477; 3,260,563; and 3,902,798. The preceding and like travelling-matte systems have also been reviewed in the technical literature. See, for example, "Travelling-Matte Photography and the Blue Screen System," Beyer, Journal of the Society of Motion Picture and Television Engineers, March 1965, Vol. 74, No. 3, pp. 217-236; "The Technique of Special Effects Cinematography," Fielding, 1968, pp. 218-253; and "Talking Technically," David Samuelson, American Cinematographer, May 1982, page 434, and June 1982, page 588.

Early single-film matte processes relied upon contrast alone, the foreground action being filmed against a jet black backing and the resulting image being printed through several generations of high contrast film stock until a matte was produced. The results obtained by this technique were generally quite poor, due to the inevitable distortion produced by the multiple reversals.

Subsequently, with the advent of subtractive color film, a single film technique was developed which relied upon the dedication of one of the three emulsion layers of the color negative film to the matte. While all three emulsion layers have been utilized from time to time for matte formation, the blue layer has always been preferred. Consequently, the dominant travelling matte process extant in the industry today is the "blue screen" process.

While there are numerous variations of the blue screen process, each generally involves exposure of a color negative film to a foreground subject in front of a blue backing. The backing may, for example, be a front lit painted backing, a projection screen which is front lit by reflection from a blue light source, or a rear lit translucent blue transmission screen. The color negative image thus formed is utilized, dependent upon the particular technique employed, to produce sets of black and white separation negatives and matte images. The mattes are thereafter used to facilitate compositing of the foreground subject with the image of a separate background scene.

Prior single-film matte processes have, however, been subject to a number of disadvantages. Thus, rapidly moving objects whose images streak, as well as finely detailed subjects such as hair, or glass, are difficult to reproduce without "fringing," i.e., producing either a truncation of the subject or a black border or "matte line" adjacent to it. In the case of rapidly moving objects, for example, their partially exposed edges either "drop in" or "drop out" of the matte in sequential frames, thereby producing the fringing effect. Moreover, there can be nothing in the foreground subject which is pure blue in color, since it would be matted with the blue screen and permit the background scene to show through the "hole" during compositing. While techniques have been developed to resolve these problems (see, for example, Vlahos U.S. Pat. No. 3,158,477) such have been uneconomical in both time and materials.

Various multi-film systems have also been developed for the formation of travelling mattes. Such typically require the huge, complex "Technicolor" camera, and employ the simultaneous exposure through a beam splitter of a color negative film and a further film sensitive to some narrow portion of the spectrum. The matte image is thereby formed on the latter film, thus eliminating the necessity to produce separation negatives, and obviating the loss of any portion of the spectrum for matte formation. Such techniques (see, for example, Vlahos U.S. Pat. No. 3,095,304) may be utilized in the formation of travelling mattes of objects which move or which have fine details (e.g., hair) without fringing.

In recent years the filming of elaborate science fiction films has necessitated the compositing of numerous, finely detailed models defining foreground subjects such as space ships and the like, under conditions designed to simulate high speed, "real" relative motion therebetween. It has become necessary to produce many overlapping images and to record "streak," that blurring of a moving subject when photographed which allows the human eye to perceive and interpret the movement as real. In producing such special effects, it is desirable to employ the largest possible film format in order to reduce the image degradation resulting from the numerous reversals required to produce the final composite images. Moreover, the cameras necessary to photograph the miniature models required for such purposes must themselves be miniature in order to maneuver about their nodal points in close proximity to the models.

In view of the preceding requirements, it has not been feasible to utilize the multi-film system of travelling matte cinematography in the production of recent special effects films. Since available multi-film systems require both the use of a relatively large and complex camera and a relatively small size film format, they are simply inadequate.

For the production of the special effects in the motion picture "Star Wars", special motion control systems were developed to permit miniature cameras to make numerous passes relative to multiple miniature models to be photographed in perfect registration and at variable exposure rates. Employing such a motion control system, it is possible to obtain substantially the same quality travelling mattes produced by the use of multi-film matting techniques, merely by filming consecutive passes relative to the foreground subject (the miniature model or models)—the "matte" pass and the "subject" pass being photographed separately and sequentially on the same film load. By exposing the models on the matte pass in front of a back-lighted blue screen in conjunction with a blue filter at the camera, very pure monochromatic blue matte images are produced.

A major problem with any travelling matte system which utilizes an illuminated screen behind a foreground subject to produce a matte is, however, that the radiation transmitted from the screen, whether it be infrared, ultraviolet or within the visible spectrum, is reflected from any glossy or specular metallic surface on the foreground subject. In fact, it was found in the filming of "Star Wars" that the problem of reflected light ("blue spill") is exacerbated whenever a wide angle lens is utilized, since the model or other subject to be photographed must then be relatively close to the blue screen to permit sufficient blue screen area in the frame surrounding the subject. Various techniques have been developed to improve matte formation, notwithstanding blue spill; these include the exposure and matting of various back-up passes of the models to be photographed and the formation of a so-called "garbage matte" to mask the light stands and assorted paraphernalia illuminated by the untoward blue spill. Apart from the use of such auxiliary techniques, however, the minute reflective elements, e.g., wires, thin wings, struts, etc., of the finely detailed models photographed are apt to be "wrapped" by the transmitted light, and "drop out" of the resulting matte, resulting in holes or separations therein.

It is, accordingly, among the objects of the present invention to provide an improved blue screen process for travelling matte cinematography which overcomes the disadvantages of conventional blue screen processing of images of highly reflective and/or finely detailed foreground subjects, without necessitating any additional matting steps or the like. A further object is to provide such a process which is particularly useful in special effects cinematography of miniature models or other foreground subjects which may have to be photographed under conditions designed to simulate rapid relative movement therebetween. These and other objects and advantages of the present process will be apparent from the following description of preferred embodiments thereof taken in connection with the accompanying drawing.

DISCLOSURE OF THE INVENTION

This invention involves a significant improvement in the blue screen process for composite travelling matte cinematography. As noted hereinabove, that process involves the exposure of a color negative film to a foreground subject in front of a contrasting backing screen, printing high contrast black-and-white mattes therefrom, and printing images of the foreground subject in registration with the mattes and with a predetermined background scene to produce the desired composite photographic images. The improvement of the present invention comprises luminescing at least a portion of the foreground subject during the matte-forming exposure at a wavelength actinic to the color negative film in order to form an image of the luminescing portion of the subject in the film, and thereafter forming the desired travelling mattes from that image.

By proceeding in this manner, the conventional blue screen process has, in effect, been turned "inside out", i.e., instead of forming a matte of the model or other foreground subject to be composited by exposing it in front of an illuminated background screen, the subject is instead made an illuminating light source and exposed in front of a contrasting background. In other words, in accordance with the "negative" or "reverse blue screen" process of this invention, travelling mattes of the foreground subject are photographically produced by converting the subject itself to a source of radiation rather than to a mere reflector of radiation from the background blue screen.

The preceding is readily effected by pre-coating at least portions of the foreground subject with a phosphorescent material which is invisible upon exposure to visible light, but which emits light of a predetermined wavelength, e.g., blue light, upon excitation by ultraviolet light, and illuminating the foreground subject with ultraviolet light to phosphoresce those portions to form a latent matte image thereof on the color negative film. The formation of luminescing images for composite special effects has previously been described as, for example, in Reid, U.S. Pat. No. 3,085,877, granted Apr. 16, 1963. That patent does not, however, disclose the process of the present invention in which luminescent materials are utilized to form matte images for travelling matte cinematography.

Matte images thus formed exhibit a number of advantages relative to those produced in previously known blue screen cinematographic processes. Thus, since the photosensitive emulsion is not exposed by reflection from the foreground subject, the latter may incorporate highly reflective surfaces such as glossy paint or specular metallic materials, may comprise fine, detailed elements such as mesh, thin wires, struts, or wings of very narrow sections, or may be of any color including blue. Moreover, since the matte image is formed almost exclusively by the phosphorescent coating(s) on the foreground subject with relatively little vestigial imaging from the subject itself, chromatic, textural or like variations on the foreground subject are not duplicated. Such result is desirable, since a monochromatic image having as uniform a density as possible is preferred for matte formation.

In addition, use of the reverse blue screen technique hereof has been found to facilitate the reproduction of streak between foreground subjects without fringing, and to permit better recordation of smaller foreground subjects which may, as they recede into the distance, disappear upon conventional blue screen processing.

The reverse blue screen process also simplifies both the procedures required during both the initial optical imaging and the subsequent photographic processing steps utilized for matte formation and compositing. Thus, neither illuminated backing screens nor complex foreground subject illumination systems need be utilized, providing greater latitude in both illumination of the foreground subject and motion of the camera relative thereto. Also, unlike either the prior multi-film or single-film blue screen systems, the reverse blue screen technique does not require any particular film format and may be employed with large formats, e.g., 65 mm. Moreover, less optical reversals and individual films need be processed in the reverse blue screen process than required in previous techniques (e.g., "back-up passes" and "garbage mattes" are essentially eliminated). Total filming and processing time and materials are thus reduced.

On the other hand, any holes, cracks or severe textures on the foreground subject may not transmit sufficient visible light upon ultraviolet irradiation. Accordingly, it may be necessary, employing the reverse blue screen process, to provide removable covering for any such areas and to coat the same with the phosphorescing material to complete the image and avoid hole formation in the mattes subsequently produced.

Notwithstanding the preceding disadvantage, it may be seen that the use of the reverse blue screen process of this invention broadens the range and scope of special effects possible, simplifies the optics and subsequent processing operations, and significantly improves the final composite images produced in the blue screen process for travelling matte cinematography.

Various preferred embodiments of the process of the invention are more fully described below in connection with the accompanying drawing. It should be noted that as described in this specification and illustrated in the accompanying drawing, the reverse blue screen process comprehends the compositing of most, non-live action foreground subjects; hence, while the invention is principally described in connection with the filming of miniature, detailed models such as space ships, aircraft or the like, it is intended to be useful in any form of travelling matte cinematography. It will further be understood that, while the invention is principally described herein in connection with the formation of luminescing images by the excitation of phosphorescent materials (including fluorescent materials) with ultraviolet light, other forms of invisible radiation, e.g., infrared radiation or combinations of infrared and ultraviolet radiation, may be similarly employed.

BEST MODE FOR CARRYING OUT THE INVENTION

Figure 1:
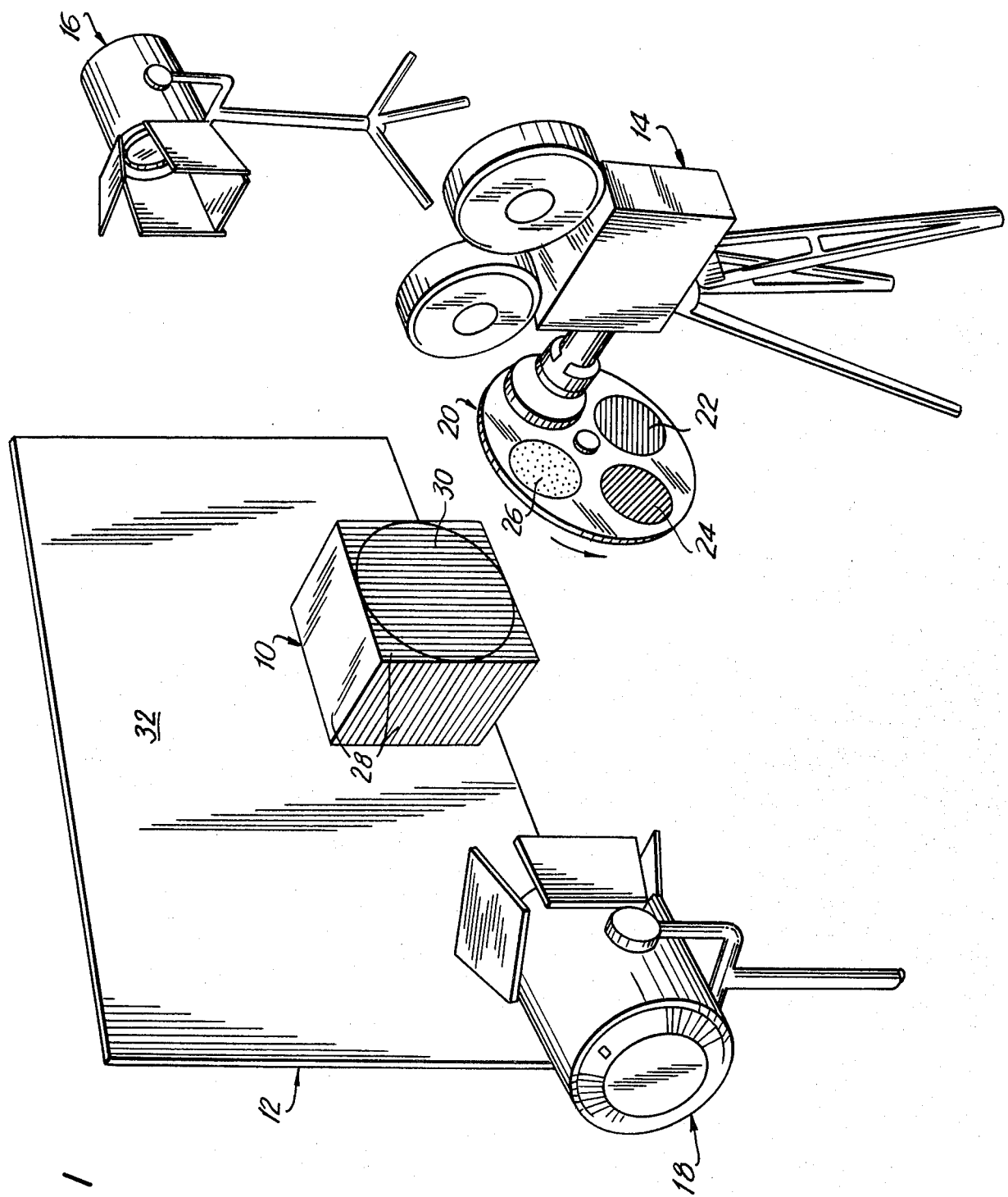
FIG. 1 is a partially diagrammatic, perspective view of one form of apparatus for photographing foreground subjects in the practice of the process of the present invention.

As illustrated in FIG. 1 of the drawing, in accordance with the reverse blue screen process hereof, travelling mattes are produced by photographing a foreground subject designated generally at 10 in front of a background screen 12 with a camera 14. A visible or "white light" source 16 and an ultraviolet light source 18 are provided for alternately exposing the subject 10 to an action or "beauty" pass and a matte pass in which a latent matte image of the subject is formed. Further, a filter means is provided on the camera; for purposes of illustration shown on the drawing as filter wheel 20, provided with individual filters 22, 24 and 26 (which may, for example, be blue, green and red filters) is attached to camera 14 to facilitate the successive beauty and matte passes.

In use, a color negative film within camera 14 is initially exposed to visible light transmitted from white light source 16 and reflected from subject 10 to the camera. One or more matte passes is subsequently made in synchronism with the original visible light exposure to form matte images of predetermined portions of subject 10. For example, a first portion comprising a blue-phosphorescing coating 28 on each of the exposed portions of subject 10 may be provided by pre-coating the subject with a lacquer containing a phosphor material which emits blue light upon excitation by the ultraviolet light 18. Similarly, a second portion comprising a green-phosphorescing coating 30 on the circular area on one face of subject 10 may be provided by pre-coating that area with a lacquer containing a phosphor material which emits green light upon excitation by the ultraviolet light source 18. Finally, a third portion comprising a red-phosphorescing coating 32 on the backing screen 12 may be provided by pre-coating the screen with a lacquer containing a phosphor material which emits red light upon excitation by the ultraviolet light 18.

The blue-phosphorescing coating 28 and the green-phosphorescing coating 30 on subject 10 are transparent and thus invisible upon exposure to visible light, where the red-phosphorescing coating 32 on backing screen 12 may either be invisible or visible (e.g., red) upon exposure to visible light. Any conventional phosphor materials meeting these requirements may be thus utilized. For example, the blue phosphor may comprise anthracene or commercially available materials such as Ultraviolet Products' "Readmission Ink" or "Tracer Additives TA 102" or "TA 103," or Shannon Luminous Material Co.'s "Invisible Blue." The green phosphor material may, for example, comprise acriflavin or commercially available materials such as Ultraviolet Products' "Tracer Additive TA 100" or Shannon Luminous Materials Co.'s "Invisible Green No. 30." In like manner, the red phosphor may be a commercial material such as Day-Glo Products' "AX 13."

The phosphorescent materials are applied to the foreground subject in any appropriate vehicle, e.g., a vinyl or alkyd carrier, or an acrylic lacquer such as Dupont's "Lucite 326 L." Where, for example, it may be desired to ultimately dissolve and remove the phosphor coating, the phosphor may be incorporated in a carrier such as Liquitex' "Soluvar," a benzene-soluble acrylic resin. The use of other phosphor materials and/or lacquers or like carriers will readily occur to those skilled in the art.

When the foreground subject is illuminated by a normal stage lighting source (e.g., white light 16), the light reflected therefrom forms a color image of the subject (without any imaging of either of the transparent coatings 28 or 30) on the color negative film in camera 14. While the backing screen 12 may be imaged at the same time, that fact is of no consequence, since the backing image is subsequently matted for compositing. It is for this reason that the red-phosphorescing coating 32, unlike coatings 28 and 30, need not be invisible upon exposure to the visible light from white light source 16.

If desired, the visible light exposure may be taken through an ultraviolet blocking filter, e.g., a Wratten 2B, if light source 16 is of a type which emits appreciable amounts of ultraviolet radiation.

A second pass synchronized with and sequential to the initial visible light exposure is thereafter filmed to form a latent matte image on the same color negative film. The matte exposure is effected by extinguishing white light 16 and irradiating subject 10 by the ultraviolet light source 18. The ultraviolet radiation (e.g., having a wavelength of approximately 360 nm.) excites the blue-phosphorescing material in coating 28, visible blue light (about 430 nm) being emitted from the subject. To insure exposure of the negative film solely by the blue-illuminating source thus produced, the film in camera 12 is exposed through both an ultraviolet blocking filter and a blue filter (filter 22). The former filters out any reflected ultraviolet radiation which would otherwise fog the sensitive emulsion, while the latter filters out all visible non-blue light generated by the other phosphor materials. The filters thereby restrict the latent image formed on the negative film to the portions of subject 10 coated by the blue phosphor material, in this instance to its entire surface. The latent matte image of the foreground subject thus formed may then by processed as described below.

A matte image of the circular portion of foreground subject 10 defined by the green-phosphorescing coating 30 is thereafter formed in like manner. Thus, in a third pass synchronized with the initial exposure, the white light source 16 is extinguished and the ultraviolet light source 18 is utilized to excite the green-phosphor material in coating 30. In this instance, the coating phosphoresces green light (about 520-540 nm.). In this instance, the film in camera 12 is exposed through both the ultraviolet blocking filter and the green filter 24. The green light generated by the circular coating 30 is thus utilized to form a corresponding circular latent matte image on the negative film.

If desired, a further latent matte image may be produced in the same manner by excitation of the red-phosphor material in coating 32 on the backing screen 12 with the ultraviolet light source 18, by exposing the film through the red filter 26, solely the red-phosphorescing coating 2 on the screen is thus imaged. In this manner, a matte of the backing screen itself may be produced.

Figure 2:
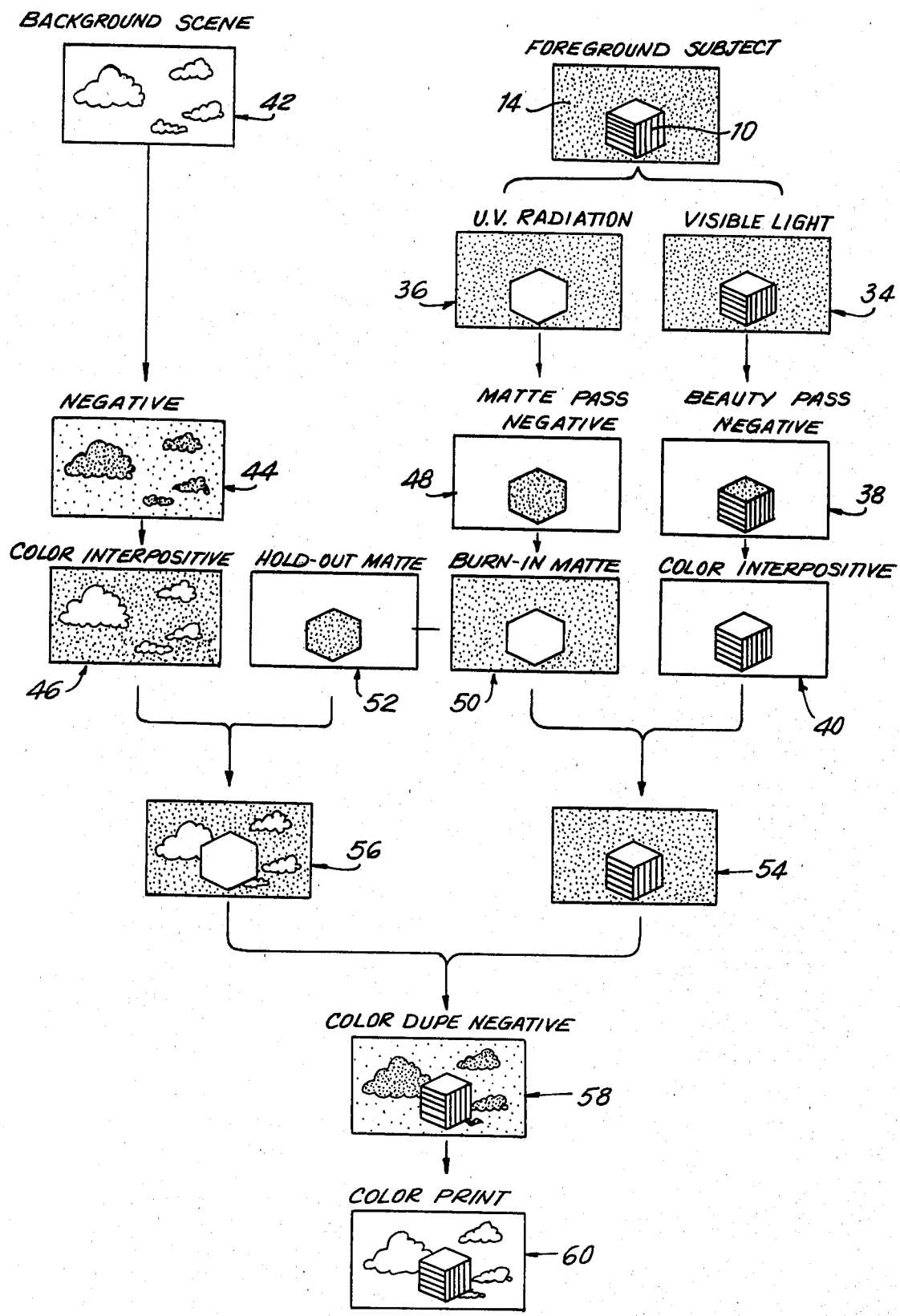
FIG. 2 is a schematic flow sheet illustrating the successive stages of one embodiment of the process in which a single set of matte images is produced by the exposure of a single phosphorescing coating on the foreground subject to be composited.
Figure 3:
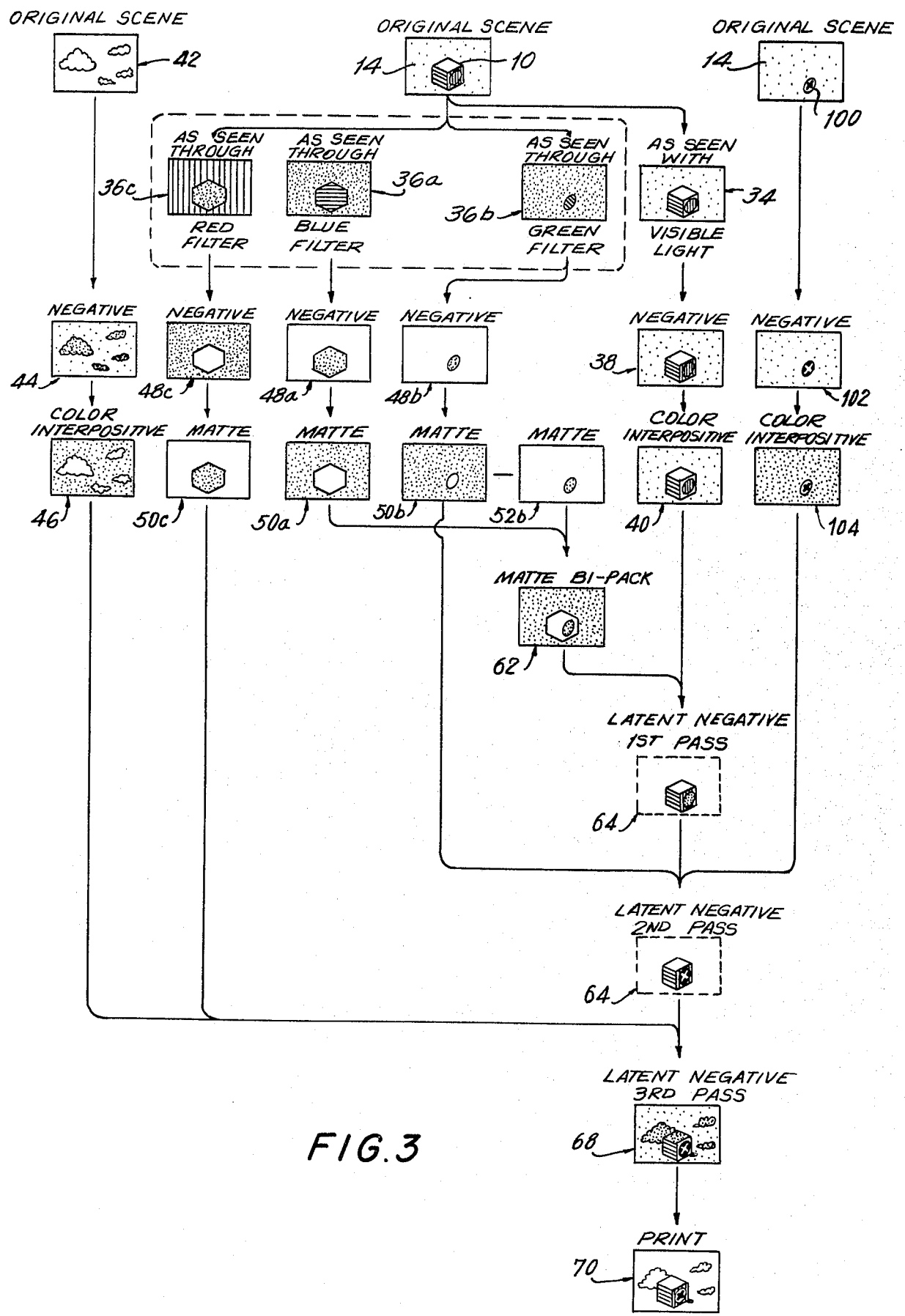
FIG. 3 is a schematic flow sheet similar to FIG. 2, illustrating the successive stages of a second embodiment of the invention in which three different sets of matte images are produced by the ultraviolet excitation of three different areas of an original foreground scene which phosphoresce in three different colors, in order to produce travelling mattes of a corresponding number of specific portions of the model or other subject to be composited.

Latent images which have been formed as described in connection with FIG. 1 may thereafter be composited in the manner shown in either of FIGS. 2 or 3 of the drawing. In FIG. 2, matte images are formed by a single matte pass of the type described in connection with the exposure of the blue-phosphorescing coating in FIG. 1. In FIG. 3, on the other hand, matte images are formed by synchronized passes and exposures from each of the individual portions 28, 30 and 32 of the foreground subject and backing screen exposed as described in FIG. 1.

Referring initially to FIG. 2, the foreground subject 10 in front of backing screen 12 is illuminated, in sequence, by the visible light and ultraviolet light sources as aforesaid to form an initial or beauty pass, latent image 34, and a matte pass, latent image 36. The former is then processed to form beauty pass negative 38, and reversed to form color interpositive 40 for compositing as described below.

A background scene 42 to be composited with the foreground subject 10 is separately exposed on a color negative film, the film is processed to form background negative 44, and thereafter reversed to produce background color interpositive 46.

Interpositives 40 and 46 are composited by means of travelling mattes produced from the latent matte image 36 as follows. Initially, the latent matte image is processed to form a matte pass negative 48. This negative is then reversed and printed on a high contrast film stock, preferable to a density variation of approximately 2.6-2.7 between the high density areas of the foreground subject and the unexposed background area of the matte pass negative. A high contrast, black and white burn-in matte 50 is thus produced. By controlling the degree of contrast in the formation of the burn-in matte, the foreground subject ends to be "pinched-in" in the matte image, thus facilitating subsequent compositing. The burn-in matte is then reversed to form a high contrast black and white hold-out matte 52.

Thereafter, the burn-in matte 50 and foreground color interpositive 40 are bi-packed and exposed to form a latent matte foreground image 54; the hold-out matte 52 and the background color interpositive 46 are bi-packed and exposed to form a latent matte foreground image 54; the hold-out matte 52 and the background color interpositive 46 are bi-packed and exposed to form a latent matte background image 56; and the two bi-packs are printed onto a color negative film to form a composite color dupe negative 58. The color dupe negative is then reversed in conventional manner to produce the desired composite print of the foreground subject with the background scene, viz., a color print 60.

If desired, an image of the red-phosphorescing coating 32 on backing screen 14 (see FIG. 1) may be overprinted on the latent matte image 36 (see FIG. 2). The burn-in and hold-out mattes may be directly formed from that composite, matte image. Alternatively, by modifying the specific areas coated, different information may be imparted to the composite matte image from the individual images composited.

One application of such a technique in which a "blue phosphor" matte pass and a "red phosphor" matte pass may be combined involves the compositing of the cockpit of an aircraft model with a background scene where it is desired to image both the cockpit area and the background through the cockpit windows. Employing conventional blue screen techniques, the light transmission through the several layers of cockpit glass could drop off in intensity and "fall out" of the matte. Alternatively, light transmission through the cockpit glass could be sufficient for matte formation while any information in the glass area (e.g., reflections) would be obliterated and replaced by the background. On the other hand, employing the reverse blue screen process hereof, the cockpit windows are covered with a blue-phosphorescing coating for the blue pass, creating a complete matte which (if used alone) produces an image of the cockpit and the glass with any reflections indicated thereon, but with the background a black void. By adding a red phosphor pass (in which the blue-phosphorescing coating is removed from the cockpit windows), the background area behind the cockpit glass is recorded on the hold-out matte. Both the cockpit glass and the reflections thereon, and the background behind the cockpit, are thus printed as a double exposure.

Travelling mattes may further be produced employing additional matte images, e.g. of additional information such as the green-phosphorescing coating 30 as illustrated in FIG. 1. The formation of composite images utilizing three different sets of matte images, and facilitating the input of yet additional information, is shown in FIG. 3. As shown therein, the foreground subject 10 and background scene 42 are initially filmed on separate color negative films, providing color negatives 38 and 44, and reversed to produce color interpositives 40 and 46, respectively, as described hereinabove. In like manner, additional information to be composited with the foreground subject 10 (for example, the X identified generally by numeral 100) is filmed on a further color negative film, color negative 102 is produced therefrom, and then reversed to form color interpositive 104. Interpositives 40, 46 and 104 are thereafter composited with appropriate travelling mattes.

The matte images are separately formed, in synchronism, by exposing predetermined phosphorescing portions of foreground subject 10 in the manner described hereinabove, forming initial latent incremental images 36a, 36b, and 36c representing the blue-phosphorescing, green-phosphorescing and red-phosphorescing portions of the foreground subject. The latent matte images are then processed to form negatives 48a, 48b and 48c, and printed to high densities to form high-contrast, black and white mattes 50a, 50b, and 50c, respectively. In the specific technique illustrated, matte 50b, is reversed to form a corresponding hold-out matte 52b, and the latter is bi-packed with matte 50a to form a latent matte bi-pack 62 of the foreground subject and additional information. This matte image is then composited with color interpositive 40 to form latent negative (first pass) 64. The latter is then bi-packed with matte 50b and color interpositive 104 to form latent negative (second pass) 66. Finally, matte 50c and color interpositive 46 are bi-packed with negative 66 to form the composite latent negative (third pass) image 58, which is then processed and reversed to form the desired final composite print 70.

Reverse blue screen techniques such as illustrated in FIG. 3 may conveniently be utilized when it is desired to form composite images of, for example, the cockpit of an aircraft model such as described above, showing, in addition to the cockpit area and the background behind the cockpit windows, certain information within the cockpit area itself, e.g., a console screen visible on an instrument panel within the cockpit. Use of the third group of matte images (for example latent negative 36b, negative 48b, and matte 50b) produced by the "green pass" facilitates the composition of images which may include both a screen display on an instrument panel seen through the window of the cockpit, and reflections thereon.

A further application of the reverse blue screen process of this invention involves the display of reflections on polished surfaces. In this instance, the "spill" which naturally occurs in the red screen pass (as in conventional blue screen processing) permits the double-exposure of the background scene on the previously printed "whole" image of the foreground subject. In conventional blue screen techniques, on the other hand, the background would totally replace the foreground subject. Thus, employing the present technique, in the "red-screen" pass, light is transmitted from the red-phosphorescing background areas to the foreground subject. Employing a reflective foreground subject, portions of the red light are reflected to the film. The color negative thus formed has an image formed by the reflected "spill" in addition to the image formed of the red background. A burn-in negative is then produced of the blue-phosphorescing foreground subject. This negative images the entire foreground subject. Each of these negatives is reversed, providing hold-out and burn-in mattes, respectively. By compositing the hold-out matte with the background image, and the burn-in matte with the foreground subject, a composite image is formed in which the foreground subject is double-exposed in the previous "spill" region.

Alternatively, additional information may be printed into the "spill" area. Thus, a "matte difference matte" may be produced where, for example, it is desired to print the reflected light of a sunset onto an aircraft or to illustrate the glow of a spacecraft upon re-entry into the atmosphere. In this instance, a supplemental matte (the "matte difference matte") is produced and double-exposed over the foreground subject to produce the additional effect.

It will be understood that various modifications may be made in the preferred embodiments described hereinabove without departing from the scope of the present invention. For example, the reverse blue screen technique may be utilized in stop-motion animation photography rather than for travelling matte cinematography. Accordingly, it is intended that the scope of the present invention be determined solely from the claims appended hereto.

We claim:

1. In a travelling matte process for composite photography, which comprises exposing a photosensitive medium to a foreground subject in front of a contrasting backing, printing high contrast black-and-white mattes therefrom, and printing images of the foreground subject in registration with said mattes and with a predetermined background scene to produce composite photographic images; the improvement comprising luminescing at least portions of the foreground subject during the exposure step at wavelengths actinic to said medium to form an image of solely said portions of the foreground subject in said medium, and printing said mattes from said image.

2. The travelling matte process of claim 1, wherein the foreground subject is pre-coated in at least said portions with at least a phosphor material which is invisible upon exposure to visible light, but which emits light of predetermined wavelengths upon excitation by ultraviolet light, and wherein the foreground subject is illuminated by ultraviolet light, said portions of the foreground subject thereby phosphorescing and forming said image.

3. The travelling matte process of claim 2, wherein the photosensitive medium is exposed to the light emitted by the phosphorescing portions of the foreground subject through filter means which filters out ultraviolet light and substantially all visible light other than that of said predetermined wavelengths in order that said image is formed solely by said portions of the foreground subject.

4. A reverse blue screen process for travelling matte cinematography, which comprises:
  (a) printing color images of a foreground subject and a background scene with visible light on color negative films;
  (b) exposing a color negative film to the foreground subject by illuminating the foreground subject with ultraviolet light and luminescing at least portions of the foreground subject at wavelengths actinic to said film to form a matte negative of solely said foreground subject in the film, the ultraviolet light exposure being synchronized with the visible light exposure of the foreground subject in step (a) to facilitate subsequent registration of the images formed thereby;
  (c) reversing the matte negative formed in step (b) and printing a high contrast black-and-white burn-in matte therefrom;
  (d) reversing the burn-in matte to produce a high contrast black-and-white hold-out matte therefrom; and
  (e) compositing the burn-in and hold-out mattes with the color images of the foreground subject and background scene formed in step (a) to produce the desired composite color image thereof.

5. The reverse blue screen process of claim 4, wherein the foreground subject is pre-coated in at least said portions with at least a phosphor material which is invisible upon exposure to visible light but which emits blue light upon excitation by ultraviolet light, and wherein said portions of the foreground subject phosphoresce upon the ultraviolet light illumination thereby forming said matte negative.

6. The reverse blue screen process of claim 4, wherein the foreground subject is pre-coated in predetermined areas with at least two phosphor materials which are invisible upon exposure to visible light but which emit light at distinct wavelengths upon excitation by ultraviolet light, and wherein high contrast black and white mattes are sequentially formed of said predetermined areas of the foreground subject to permit compositing of each of said areas with the background scene.

7. The reverse blue screen process of claim 4, wherein the color images printed in step (a) are formed by exposing a foreground subject and a background scene to visible light to form color negatives thereof, and said negatives are thereafter reversed to form corresponding interpositives, wherein the burn-in and hold-out mattes are composited in step (e) with the interpositives of the foreground subject and the background scene, respectively, to produce a composite color dupe negative, and wherein the color dupe negative is reversed to produce the desired, composite color print.

8. A reverse blue screen process for travelling matte cinematography, which comprises:
  (a) coating predetermined portions of a finely detailed model, displaying specular reflectance and comprising a foreground subject, with phosphor materials which are invisible upon exposure to visible light but which emit blue, red and green light, respectively, upon excitation by ultraviolet light;
  (b) exposing a color negative film to the model in visible light to form a color negative thereof;
  (c) in synchronism with step (b), exposing said film to the model through a blue filter and illuminating the model with ultraviolet light to form a matte negative of the blue-phosphorescing areas of the model on said film;
  (d) further in synchronism with step (b), exposing said film to the model through a red filter and illuminating the model with ultraviolet light to form a matte negative of the red-phosphorescing areas of the model on said film;
  (e) further in synchronism with step (b), exposing said film to the model through a green filter and illuminating the model with ultraviolet light to form a matte negative of the green-phosphorescing areas of the model on said film;
  (f) exposing a color negative film to a background scene in visible light to form a color negative thereof;
  (g) reversing the color negatives of the model and the background scene to form interpositives thereof;
  (h) printing high contrast black-and-white mattes from each of the matte negatives formed in steps (c), (d) and (e); and
  (i) compositing the interpositives formed of the model and the background scene in steps (b) and (f) with the black-and-white mattes of the blue-, red- and green-phosphorescing areas of the model, and printing composite color images thereof.

9. In a travelling matte process for composite photography, which comprises exposing a photosensitive medium to a foreground subject in front of a contrasting background field, printing high contrast black-and-white mattes therefrom, and printing images of the foreground subject in registration with a predetermined background scene and said mattes to produce composite photographic images; the improvement comprising luminescing at least portions of the foreground subject or the background field at wavelengths actinic to said medium to form images of solely said portions of the foreground subject or background field in said medium, and printing said mattes from said images.

* * * * *